United States Patent [19]

Koyama et al.

[11] 4,369,288
[45] Jan. 18, 1983

[54] ODORLESS OR LOW-ODOR CROSSLINKABLE COMPOUND AND RESIN COMPOSITION CONTAINING THE SAME

[75] Inventors: Tohru Koyama, Hitachi; Toshikazu Narahara, Ibaraki; Yuji Aimono, Hitachi, all of Japan

[73] Assignee: Hitachi Chemical Company, Ltd., Tokyo, Japan

[21] Appl. No.: 273,034

[22] Filed: Jun. 12, 1981

Related U.S. Application Data

[62] Division of Ser. No. 139,025, Apr. 10, 1980, Pat. No. 4,297,471.

[30] Foreign Application Priority Data

Apr. 13, 1979 [JP] Japan .................................. 54-45596
Apr. 17, 1979 [JP] Japan .................................. 54-47677

[51] Int. Cl.$^3$ .................. C08L 67/02; C08L 61/18; C08L 13/00
[52] U.S. Cl. ........................................ 525/48; 525/64; 525/156; 525/441; 525/472
[58] Field of Search ................... 525/441, 48, 472, 64, 525/156

[56] References Cited

U.S. PATENT DOCUMENTS 2,806,834 9/1957 Nischk et al. ...................... 525/441
4,039,606 8/1977 Smith ................................. 525/48

FOREIGN PATENT DOCUMENTS 46-27544 8/1971 Japan ................................ 525/472

*Primary Examiner*—Wilbert J. Briggs, Sr.
*Attorney, Agent, or Firm*—Antonelli, Terry and Wands

[57] ABSTRACT

A crosslinkable compound obtained by reacting an aromatic hydrocarbon-formaldehyde resin with an α,β-unsaturated monocarboxylic acid or an ester thereof has no odor or very slight odor. Said crosslinkable compound can be radical polymerized at a low temperature to give a cured article having excellent electrical insulating properties. Said crosslinkable compound can also be used as one component of a resin composition containing an unsaturated polyester resin or a polybutadiene resin modified with acrylic or methacrylic acid to give an odorless or low-odor resin composition suitable for producing reinforced plastics, paints and varnishes, adhesives, electrical parts, etc.

8 Claims, 2 Drawing Figures

ODORLESS OR LOW-ODOR CROSSLINKABLE COMPOUND AND RESIN COMPOSITION CONTAINING THE SAME

This is a division of application Ser. No. 139,025, filed Apr. 10, 1980, now U.S. Pat. No. 4,297,471.

BACKGROUND OF THE INVENTION

This invention relates to an odorless or low-odor crosslinkable compound and an odorless or low-odor resin composition containing the same. More particularly, this invention relates to an odorless or low-odor crosslinkable compound obtained by reacting an aromatic hydrocarbon-formaldehyde resin with an $\alpha,\beta$-unsaturated monocarboxylic acid or its ester and an ordorless or low-odor resin composition containing the crosslinkable compound.

Aromatic hydrocarbon-formaldehyde resins have been studied, for example, by A. J. Baeyer in the latter half of the 19th century and resinous products have been obtained by reacting an aromatic hydrocarbon such as benzene, toluene, xylene, mesitylene, durene, naphthalene, acenaphthene, or the like with formaldehyde in the presence of a strong acid catalyst (A. J. Baeyer; Ber., vol. 5, p. 1098 (1872), ibid., vol. 6, p. 223 (1873) and ibid., vol. 7, p. 1190 (1874)). Further, new knowledge as to condensation reaction of an aromatic hydrocarbon and formaldehyde was found by R. Wegler during the Second World War and the foundation thereof has been established (R. Wegler; Angew. Chem., A/60, No. 4, p. 88 (1948)).

In Japan, M. Imoto, K. Fu, and others have widely studied aromatic hydrocarbon-formaldehyde resins after the Second World War and given foundation of development, so that aromatic hydrocarbon-formaldehyde resins such as xylene-formaldehyde resin, and the like are manufactured industrially.

As is well known in the art, aromatic hydrocarbon-formaldehyde resins are generally viscous liquid and excellent in adhesive properties, water resistance, humidity resistance, acid resistance, alkali resistance, and electrical insulating properties. But when electrical insulating materials are obtained by condensation reaction with phenols, amines, or the like at high temperatures in the presence of an acid catalyst by applying reactivity of the methylol group, ether linkage and acetal linkage in the resin, there are many disadvantages in that water is by-produced by the condensation reaction, high temperatures are necessary for completing the reaction, and the like. In addition, low-molecular weight polymers such as prepolymers usually have an odor. When they are cured, a more offensive odor is emitted, which is not preferable from the viewpoint of health of the workers and residents therearound. Such a problem should also be solved.

On the other hand, since unsaturated polyester varnishes are relatively balanced in mechanical and electrical properties, heat resistance, workability, and production cost, they have been used in large amounts in glass fiber reinforced plastics, paints and varnishes, adhesives, electrical parts, and the like. Unsaturated polyester varnishes comprise mainly unsaturated polyester resin and a crosslinkable monomer which is usually contained in an amount of 40 to 60% by weight. As the crosslinkable monomer, a relatively low-molecular weight compound such as styrene has been used from the viewpoint of properties or economy. But since the compound has a low molecular weight and is very volatile, there are many disadvantages in that the weight of the varnish is lost in an amount of 20 to 60% by weight by vaporization in the state of varnish and at the time of curing, an irritating odor is emitted and is not preferable from the viewpoint of health of the workers and residents therearound, and the like.

SUMMARY OF THE INVENTION

It is an object of this invention to provide an odorless or low-odor crosslinkable compound which can be radical polymerized at a low temperature. It is another object of this invention to provide a polymer obtained from said crosslinkable compound. It is a further object of this invention to provide an odorless or low-odor resin composition containing said crosslinkable compound overcoming the disadvantages of conventional unsaturated polyester varnishes mentioned above.

This invention provides an odorless or low-odor crosslinkable compound obtained by reacting an aromatic hydrocarbon-formaldehyde resin with an $\alpha,\beta$-unsaturated monocarboxylic acid or an ester thereof.

This invention also provides a polymer of odorless or low-odor crosslinkable compound obtained by reacting an aromatic hydrocarbon-formaldehyde resin with an $\alpha,\beta$-unsaturated monocarboxylic acid or an ester thereof.

This invention further provides an odorless or low-odor resin composition comprising:

(A) an unsaturated polyester resin or a polybutadiene resin modified with acrylic acid or methacrylic acid, and (B) a crosslinkable compound obtained by reacting an aromatic hydrocarbon-formaldehyde resin with an $\alpha,\beta$-unsaturated monocarboxylic acid or an ester thereof.

This invention still further provides a polymer of said crosslinkable compound and a process for the production thereof.

DESCRIPTION OF THE PREFERRED EMBODIMENTS

Figure 1:
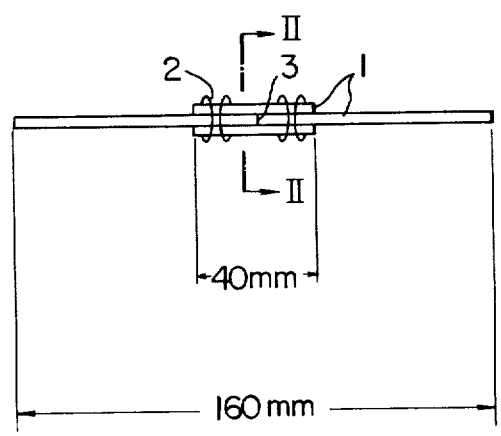
FIG. 1 is a front view of a test piece and
FIG. 2 is a cross-sectional view of the test piece taken along the line II—II of FIG. 1, for measuring adhesive strength under shear.

The aromatic hydrocarbon-formaldehyde resin used in this invention as a starting material can be obtained by condensation reaction of an aromatic hydrocarbon with formaldehyde by a conventional process. Examples of the aromatic hydrocarbon-formaldehyde resins are xylene-formaldehyde resin, toluene-formaldehyde resin, mesitylene-formaldehyde resin, durene-formaldehyde resin, naphthalene-formaldehyde resin, and the like.

Examples of the $\alpha,\beta$-unsaturated monocarboxylic acids and their esters are acrylic acid, methacrylic acid, $\alpha$-chloroacrylic acid, crotonic acid and their alkyl esters, the alkyl moiety having 1 to 4 carbon atoms, e.g. methyl acrylate, methyl methacrylate, ethyl acrylate, ethyl methacrylate, propyl acrylate, propyl methacrylate, butyl acrylate, butyl methacrylate, etc. These compounds may be used alone or as a mixture thereof.

The reaction of the aromatic hydrocarbon-formaldehyde resin with the $\alpha,\beta$-unsaturated monocarboxylic acid or its ester can be carried out with heating, if required, by using a conventional esterification catalyst, an ester interchange catalyst, a polymerization inhibitor, and the like. In the reaction, a desired amount of the unsaturated monocarboxylic acid group (e.g. acrylic acid group or methacrylic acid group) can be introduced into the crosslinkable compound by changing the reaction conditions such as changing the amount of the α,β-unsaturated monocarboxylic acid or its ester. Further, a viscosity of the resulting crosslinkable compound can be adjusted desirably by changing the molecular weight of the aromatic hydrocarbon-formaldehyde resin. As mentioned above, it is possible to give various kinds of crosslinkable compounds by changing the reaction conditions such as the kind and use amount of the aromatic hydrocarbon-formaldehyde resin and/or α,β-unsaturated monocarboxylic acid or its ester, reaction time and reaction temperature. More concretely, the crosslinkable compound having desirable properties can be obtained by using preferably 10 to 200 parts by weight, more preferably 30 to 110 parts by weight, of the α,β-unsaturated monocarboxylic acid or its ester based on 100 parts by weight of the aromatic hydrocarbon-formaldehyde resin, and heating preferably at a temperature of 80° to 130° C., more preferably refluxing at a temperature of 100° to 130° C.

The ester linkage derived from the reaction of the aromatic hydrocarbon-formaldehyde resin with the α,β-unsaturated monocarboxylic acid or its ester can be identified in the resulting crosslinkable compound by infrared absorption spectra. The crosslinkable compound has no odor or a very slight odor and can be polymerized by radical polymerization at a low temperature. A cured article can be formed from the crosslinkable compound at a temperature of preferably from room temperature to 180° C., more preferably from 60° to 130° C. for preferably from 10 minutes to 20 hours, more preferably from 1 to 15 hours, by using a curing agent in an amount of preferably 0.1 to 5% by weight, more preferably 1 to 30% by weight together with a curing accelerator in an amount of preferably 0 to 2% by weight based on the weight of the crosslinkable compound. The resulting cured article is excellent in electrical insulating properties. In order to form cured articles from the crosslinkable compound, there can also be used one or more crosslinkable monomers, polymerization inhibitors, fillers, an the like additives together with the curing agent and the curing accelerator, examples of these catalyst and additives being explained in detail hereinafter as to the odorless or low-odor resin composition.

Further the crosslinkable compound is very useful as a crosslinking agent for unsaturated polyester resins or polybutadiene resins modified with acrylic acid or methacrylic acid and is superior to the conventional crosslinkable monomers is smallness in loss of weight on volatilization. Thus, there is provided the odorless or low-odor resin composition comprising (A) an unsaturated polyester resin or a polybutadiene resin modified with acrylic acid or methacrylic acid and (B) the crosslinkable compound obtained by reacting an aromatic hydrocarbon-formaldehyde resin with an α,β-unsaturated monocarboxylic acid or an ester thereof, preferably in an amount of 20 to 100 parts by weight of (B) per 100 parts by weight of (A).

As the unsaturated polyester rein used as the component (A), there can be used various general-purpose unsaturated polyester resins obtained from the alcohol component, the acid component, and if necessary the modifying component mentioned below.

(1) ALCOHOL COMPONENT

Aliphatic glycols such as ethylene glycol, propylene glycol, diethylene glycol, dipropylene glycol, triethylene glycol, 1,3-propanediol, 1,2-propanediol, 1,2-butanediol, 1,3-butanediol, 1,4-butanediol, 1,2-pentanediol, 1,3-pentanediol, 1,2-hexanediol, 1,4-hexanediol, 2,3-hexanediol, dipropylene glycol, and the like; alicyclic diols such as cyclopentanediol, cyclohexanediol, and the like; aromatic diols such as xylene glycol, dimethylxylene glycol, 2,2-bis(4-hydroxyphenyl)-propane, and the like; ethers such as bis(2-hydroxyethyl)ether, bis(3-hydroxy propyl)ether, bis(4-hydroxy butyl)ether, and the like; polyhydric alcohols such as glycerin, trimethylolethane, trimethylolopropane, pentaerythritol, and the like; or a mixture thereof.

The above-mentioned alcohols are generally produced industrially and used for producing unsaturated polyesters.

(2) ACID COMPONENT

Unsaturated carboxylic acids such as maleic acid, maleic anhydride, fumaric acid, itaconic acid, citraconic acid, endomethylene-tetrahydrophthalic anhydride, methyltetrahydrophthalic anhydride, and the like; vegetable oil fatty acids such as those from linseed oil, soybean oil, tall oil, coconut oil, castor oil, and the like; or derivatives thereof or a mixture thereof.

Saturated acids such as phthalic acid, phthalic anhydride, isophthalic acid, terephthalic acid, adipic acid, and the like can be used, if desired, together with the acid component mentioned above.

(3) MODIFYING COMPONENT (OPTIONAL COMPONENT)

Cyclopentadiene, dicyclopentadiene, and the like.

As the polybutadiene resin modified with acrylic acid or methacrylic acid which is an alternative member of the component (A), there can be used polybutadienes having reactive double bonds at the terminals obtained by introducing active groups such as epoxy groups, hydroxyl groups, carboxyl groups, urethane groups, etc. at the terminals of polybutadienes and reacting said active groups with the carboxyl group of acrylic acid or methacrylic acid. Examples of the modified polybutadienes are a polybutadiene modified with methacrylic acid, e.g. TE-2000 (manufactured by Nippon Soda Co., Ltd., Japan), a polybutadiene modified with acrylic acid, e.g. VTB 2000×164, VTBN 1300×22, VTBNX 1300×23 (manufactured by Ube Industries, Ltd.), and the like.

The odorless or low-odor resin composition of this invention may further contain one or more curing agents, curing accelerators, crosslinkable monomers, modifying resins, polymerization inhibitors, fillers and the like.

As the curing agents, there can be used acyl peroxides such as benzoyl peroxide, acetyl peroxide, etc.; hydroperoxides such as t-butyl hydroperoxide, cumene hydroperoxide, etc.; ketone peroxides such as methyl ethyl ketone peroxide, cyclohexanone peroxide, etc.; dialkyl peroxides such as di-t-butyl peroxide, dicumyl peroxide, etc.; oxyperoxides such as t-butyl perbenzoate, t-butyl peroxyacetate, etc.

The curing agents may generally be used in an amount of 0.5 to 5% by weight, preferably 1 to 3% by weight based on the weight of resin composition.

As the curing accelerators, conventional metal (e.g. Co, Mn, Fe, Pb, Ni, Sn, Zn, or the like) salts of naphthenates or octoates can be used in an amount of up to 2.0% by weight based on the weight of the resin composition.

As the crosslinkable monomers, there can be used general-purpose crosslinkable monomers for unsaturated polyesters such as styrene, various esters of acrylic acid or methacrylic acid having high boiling points, high-boiling point allyl ethers, e.g. trimethylolpropane allyl ether, glycerin allyl ether, diallyl phthalate, diallyl isophtalate, triallyl isocyanurate, etc. These crosslinkable monomers are used as occasion demands.

As the modifying resins, saturated polyester resins, various polybutadiene resins, and the like may be used, if required.

As the polymerization inhibitors, conventional ones such as quinones, e.g. hydroquinone, p-t-butyl catechol, pyrogallol, and the like may be used in an amount of 0 to 0.5% by weight based on the weight of the resin composition.

As the fillers, there can be used those used for polyester resins such as silica, talc, calcium carbonate, asbestos, glass fibers, woodmeal, and the like, if required, with or without colorants.

This invention is illustrated more particularly by way of the following examples, in which all percents are by weight unless otherwise specified.

EXAMPLE 1

Production of Crosslinkable Compound (A)

In a 3-liter four-necked flask equipped with a stirrer, a thermometer, an Allihn condenser, 800 g of xylene-formaldehyde resin (Nikanol LLL manufactured by Mitsubishi Gas Chemical Co., Inc., average molecular weight 330–350), 250 g of methacrylic acid, 1 g of t-butyl catechol and 3 g of p-toluenesulfonic acid were placed and reacted at 100° C. for 8 hours. The reaction product was dissolved in 1 liter of benzene and washed with 500 ml of an aqueous solution of about 10% sodium carbonate followed by washing with distilled water. After removing water from the organic layer over anhydrous sodium sulfate, the benzene was removed by distillation to give 720 g of crosslinkable compound (A).

The crosslinkable compound (A) had almost no odor and a viscosity of 1.2 poises (at 25° C.). The crosslinkable compound (A) showed strong absorption at 1720 $cm^{-1}$ due to the carbonyl group of the methacrylic acid ester when measured infrared absorption spectra. Further, the crosslinkable compound (A) had 0.5 equivalent of the unsaturated bond per 100 g of the crosslinkable compound (A) when measured by the pyridine sulfate dibromide method.

EXAMPLE 2

Production of Crosslinkable Compound (B)

In a 3-liter four-necked flask equipped with a stirrir, a thermometer, and an Allihn condenser, 800 g of Nikanol LLL, 160 g of methacrylic acid, 1 g of t-butyl catechol and 2 g of p-toluenesulfonic acid were placed and reacted at 100° C. for 8 hours. After the completion of the reaction, the acid component was removed by using an ion exchange resin to give 700 g of crosslinkable compound (B).

The crosslinkable compound (B) had almost no odor and a viscosity of 1.6 poises (at 25° C.). The crosslinkable compound (B) showed strong absorption at 1720 $cm^{-1}$ due to the carbonyl group of the methacrylic acid ester in infrared absorption spectra and had 0.5 equivalent of the unsaturated bond per 100 g of the crosslinkable compound (B) when measured by the pyridine sulfate dibromide method.

EXAMPLE 3

Production of Crosslinkable Compound (C)

The process of Example 1 was repeated except for using Nikanol LL (xylene-formaldehyde resin having an average molecular weight of 350–380 manufactured by Mitsubishi Gas Chemical Company, Inc.) in place of Nikanol LLL to give crosslinkable compound (C) having almost no odor in an amount of 760 g.

The crosslinkable compound (C) showed strong absorption at 1720 $cm^{-1}$ due to the carbonyl group of the methacrylic acid ester in infrared absorption spectra.

EXAMPLE 4

Production of Crosslinkable Compound (D)

The process of Example 1 was repeated except for using Nikanol HH (xylene-formaldehyde resin having an average molecular weight of 500–600 manufactured by Mitsubishi Gas Chemical Co., Inc.) in place of Nikanol LLL to give 750 g of crosslinkable compound (D) having almost no odor.

The crosslinkable compound (D) showed strong absorption at 1720 $cm^{-1}$ due to the carbonyl group of the methacrylic acid ester in infrared absorption spectra.

EXAMPLE 5

Production of Crosslinkable Compound (E)

The process of Example 1 was repeated except for using 200 g of methyl methacrylate in place of methacrylic acid to give 730 g of crosslinkable compound (E) having almost no odor.

The crosslinkable compound (E) showed strong absorption at 1720 $cm^{-1}$ due to the carbonyl group of the metharylic acid ester in infrared absorption spectra.

EXAMPLE 6

Production of Crosslinkable Compound (F)

The process of Example 2 was repeated except for using acrylic acid in place of methacrylic acid and protecting the flask from light to give 730 g of crosslinkable compound (F) having almost no odor.

EXAMPLE 7

To each crosslinkable compound (A) to (F) obtained in Examples 1 to 6, 0.5% of PT-28 (a solution of cobalt naphthenate manufactured by Hitachi Chemical Co., Ltd.) and 1.0% of CT-3 (t-butyl perbenzoate manufactured by Hitachi Chemical Co., Ltd.) were added and gelation took place in about 20 minutes. After maintaining at 100° C. for 1 hour, electrical properties of cured articles of the crosslinkable compounds (A) to (F) were measured with the results as shown in Table 1.

TABLE 1

| | |
|---|---|
| Insulation resistance (original state) | 6–9 × $10^{16}$ ohms |
| Insulation resistance (after boiling) | 4–7 × $10^{15}$ ohms |
| Dielectric constant 20° C. (50 Hz) | 3–4 |
| Dielectric loss tangent (tan δ) 70° C. | 1–2% |

TABLE 1-continued

| Dielectric loss tangent (tan δ) 20° C. | 2-4% |
| Dielectric strength | 16 kV/mm or more |

As is clear from Table 1, the crosslinkable compounds of this invention show excellent electric insulating properties, particularly great in boiling-resistant insulating properties.

The crosslinkable compound of this invention can be radical polymerized at a low temperature and has no or very slight odor as mentioned above. Since cured articles of the crosslinkable compounds of this invention are excellent in electrical insulating properties, particularly electrical insulating properties after boiling, that is, boiling-resistant insulating properties, they are very useful as insulating materials in areas with high humidity like Japan.

EXAMPLE 8

Production of Crosslinkable Compound (G)

In a 1-liter four-necked flask equipped with a stirrer, a thermometer, and an Allihn condenser, 500 g of Nikanol LL, 125 g of methacrylic acid, 0.5 g of hydroquinone, and 0.5 g of p-toluenesulfonic acid were placed and reacted at 120° C. for 8 hours. The reaction product was dissolved in 1 liter of toluene, and washed with 500 ml of an aqueous solution of about 25% sodium carbonate three times followed by washing with distilled water. After removing water from the organic layer with calcium chloride, the toluene was removed by distillation to give 450 g of crosslinkable compound (G) having a viscosity of 1 poise (at 25° C.).

The crosslinkable compound (G) had almost no odor and showed strong absorption at 1720 cm$^{-1}$ due to the carbonyl group of the methacrylic acid ester in infrared absorption spectra.

EXAMPLE 9

Production of Crosslinkable Compound (H)

In the same flask as used in Example 8, 500 g of Nikanol LL, 150 g of methyl methacrylate, 0.5 g of hydroquinone, and 0.5 g of p-toluenesulfonic acid were placed and reacted at 120° C. for 10 hours. After completion of the reaction, the reaction product was dissolved in 1 liter of toluene and washed with an aqueous solution of about 25% of sodium carbonate and distilled water in this order. After removing water from the organic layer with calcium chloride, the toluene was removed by distillation under reduced pressure of 5 mm Hg at 40° C. to give 400 g of crosslinkable compound (H) having a viscosity of 1 poise (at 25° C.).

The crosslinkable compound (H) had almost no odor and showed strong absorption at 1720 cm$^{-1}$ due to the carbonyl group of the methacrylic acid ester in infrared absorption spectra.

EXAMPLE 10

Production of Crosslinkable Compound (I)

The process of Example 8 was repeated except for using Nikanol HH in place of Nikanol LL to give 460 g of crosslinkable compound (I) having almost no odor.

EXAMPLE 11

Production of Crosslinkable Compound (J)

The process of Example 8 was repeated except for changing the reaction temperature to 150° C., the reaction time to 30 hours, and the amount of methacrylic acid to 200 g to give 480 g of crosslinkable compound (J) having almost no odor.

EXAMPLE 12

Varnish (K) was prepared by mixing with stirring 100 g of the low-odor crosslinkable compound (G) obtained in Example 8, 50 g of TE-2000 (a polybutadiene resin modified with methacrylic acid manufactured by Nippon Soda Co., Ltd., Japan), 15 g of t-butyl perbenzoate, 0.3 g of 6% cobalt naphthenate and 0.008 g of hydroquinone.

EXAMPLE 13

Varnish (L) was prepared by mixing with stirring 230 g of the low-odor crosslinkable compound (I) obtained in Example 10, 60 g of TE-2000, 60 g of B-1000 (a polybutadiene resin having a number average molecular weight of 1000, manufactured by Nippon Soda Co., Ltd., Japan), 150 g of lauryl methacylate, 5 g of t-butyl perbenzoate and 1 g of 6% cobalt naphthenate.

EXAMPLE 14

Varnish (M) was prepared by mixing with stirring 100 g of the low-odor crosslinkable compound (H) obtained in Example 9, 50 g of PS-203 (unsaturated polyester resin modified with soya oil, resin content being 98.7%, manufactured by Hitachi Chemical Co., Ltd.), 1.5 g of t-butyl perbenzoate, 0.3 g of 6% cobalt naphthenate and 0.008 g of hydroquinone.

EXAMPLE 15

Varnish (N) was prepared by mixing with stirring 100 g of the low-odor crosslinkable compound (J) obtained in Example 11, 50 g of TE-2000, 1.5 g of t-butyl perbenzoate, 0.3 g of 6% cobalt naphthenate, and 0.008 g of hydroquinone.

Properties of varnishes (K) to (N) obtained in Examples 12 to 15 and PS-202, a typical example of conventional unsaturated polyester varnishes (a varnish of unsaturated polyester resin modified with soya oil, manufactured by Hitachi Chemical Co., Ltd.), (Comparative Example), are listed in Table 2.

TABLE 2

| Example No. | | 12 | 13 | 14 | 15 | Comparative Example *8 |
|---|---|---|---|---|---|---|
| Varnish | | Varnish K | Varnish L | Varnish M | Varnish N | PS-202 |
| | In the state of varnish | Almost no odor | Almost no odor | Almost no odor | Almost no odor | Irritating odor of styrene |
| Odor | | | | | | |
| | At drying*1 | Slight odor | Slight odor | Slight odor | Slight odor | Strong irritating odor |
| Viscosity (at 25° C.) | | 10.9 | 8.0 | 13.5 | 12.1 | 1.8 |

TABLE 2-continued

| Example No. | 12 | 13 | 14 | 15 | Comparative Example *8 |
|---|---|---|---|---|---|
| (poise)*2 | | | | | |
| Gel time (100° C., min.)*3 | 8.2 | 9.1 | 6.2 | 7.3 | 8.5 |
| Tensile strength (23° C., kg/mm$^2$)*4 | 0.3 | 0.03 | 0.2 | 0.4 | 0.3 |
| Elongation (23° C., %)*4 | 39 | 39 | 28 | 37 | 32 |
| Adhesive strength under shear (23° C., kg)*5 | 39 | 15 | 51 | 35 | 24 |
| Volume resistivity (23° C., Ω-cm)*6 | $3.2 \times 10^{14}$ | $2.5 \times 10^{14}$ | $1.5 \times 10^{13}$ | $1.9 \times 10^{14}$ | $2.0 \times 10^{12}$ |
| Volatile content (%)*7 | 2.3 | 2.7 | 1.6 | 2.1 | 12.5 |

Figure 2:

Note
*1A SA-type standard drier (450 × 350 × 350 mm) was kept at 120° C. and a tin container (100 × 100 × 20 mm) containing 30 g of each varnish was placed in the drier for 30 minutes. After that period, odor in the drier was judged with the nose.
*2Viscosity was measured using a BL-type rotational viscometer.
*3In a test tube with a diameteer of 18 mm, a varnish was placed to the height of 70 mm and the time required for gelation was measured by using a GE type gelation timer.
*4Measured according to JIS K6301.
*5Using polyester coated copper wire with a diameter of 20 mm, a test piece as shown in the attached drawings was made. The test piece was coated with a varnish and cured at 120° C. for 3 hours to measure tensile strength. FIG. 1 is front view of the test piece and FIG. 2 is a cross-sectional view of the test piece at a bound part. In the drawings, 1 is polyester coated copper wire with a diameter of 2.0 mm, 2 is bind line with a diameter of 0.14 mm for biding the polyester coated copper wires, and 3 is a bound part.
*6Using a resin plate of 20 mm thick and a ultrainsulation resistance meter, volume resistivity was measured applying DC 500 V thereto.
*7In a metal laboratory dish having a diameter of 60 mm, 10 g of a varnish was placed and cured at 120° C. for 1 hour to measure weight loss.
*8As a curing agent, 1% by weight of benzoyl peroxide and as a curing accelerator, 1% by weight of PT-23 (manufactured by Hitachi Chemical Co., Ltd.) were used.

As is clear from Table 2, Varnishes K, L, M and N according to this invention are remarkably improved in odor both in the state of varnish and at drying comparing with the conventional unsaturated polyester varnishes. Further volatile content of the varnishes of the present invention is as low as ¼ or less of that of the conventional unsaturated polyester varnishes. In addition, electrical and mechanical properties of the varnishes of the present invention are as high as or higher than those of the conventional unsaturated polyester varnishes.

As mentioned above, there can be provided resin compositions which can satisfy the requirements of prevention of environmental pollution and saving resources and are suitable for producing reinforced plastics, paints and varnishes, adhesives, electrical parts, and the like.

What is claimed is:

1. An odorless or low-odor resin composition comprising:
   (A) An unsaturated polyester resin or a polybutadiene resin modified with acrylic acid or methacrylic acid, and
   (B) a crosslinkable compound obtained by reacting an aromatic hydrocarbon-formaldehyde resin with an α,β-unsaturated monocarboxylic acid or an ester thereof in the presence of an esterification or ester interchange catalyst.

2. A resin composition according to claim 1, wherein the aromatic hydrocarbon-formaldehyde resin is xylene-formaldehyde resin.

3. A resin composition according to claim 1, wherein the crosslinkable compound (B) is used in an amount of 20 to 100 parts by weight per 100 parts by weight of the resin (A).

4. A resin composition according to claim 1, wherein the α,β-unsaturated monocarboxylic acid is acrylic acid or methacrylic acid.

5. A resin composition according to claim 1, wherein the ester of α,β-unsaturated monocarboxylic acid is an alkyl ester of acrylic or methacrylic acid.

6. A resin composition according to claim 1, wherein component (A) is an unsaturated polyester resin.

7. A resin composition according to claim 1, wherein the aromatic hydrocarbon-formaldehyde resin is xylene-formaldehyde resin, toluene-formaldehyde resin, mesitylene-formaldehyde resin durene-formaldehyde resin or naphthalene-formaldehyde resin and the α,β-monocarboxylic acid is acrylic acid, methacrylic acid, α-chloroacrylic acid, or a crotonic acid and the alkyl ester contains from 1 to 4 carbon atoms in the alkyl group.

8. A resin composition according to claim 1, wherein the reaction of the aromatic hydrocarbon-formaldehyde resin with the α,β-unsaturated monocarboxylic acid or an ester thereof is effected at a temperature of 80° to 130° C.

* * * * *